(12) United States Patent
Coughlan et al.

(10) Patent No.: US 9,970,089 B2
(45) Date of Patent: May 15, 2018

(54) NICKEL-CHROMIUM-PHOSPHOROUS BRAZING ALLOYS

(71) Applicant: Metglas, Inc., Conway, SC (US)

(72) Inventors: William Coughlan, Myrtle Beach, SC (US); Eric Theisen, Myrtle Beach, SC (US)

(73) Assignee: Metglas, Inc., Conway, SC (US)

( * ) Notice: Subject to any disclaimer, the term of this patent is extended or adjusted under 35 U.S.C. 154(b) by 409 days.

(21) Appl. No.: 14/105,246

(22) Filed: Dec. 13, 2013

(65) Prior Publication Data
US 2015/0168088 A1 Jun. 18, 2015

(51) Int. Cl.
| | | |
|---|---|---|
| *C22C 45/04* | (2006.01) |
| *B32B 15/01* | (2006.01) |
| *B23K 1/00* | (2006.01) |
| *B23K 35/30* | (2006.01) |
| *B23K 35/02* | (2006.01) |
| *B23K 1/008* | (2006.01) |
| *B23K 1/19* | (2006.01) |
| *B23K 101/14* | (2006.01) |
| *B23K 103/04* | (2006.01) |

(52) U.S. Cl.
CPC ............ *C22C 45/04* (2013.01); *B23K 1/008* (2013.01); *B23K 1/0012* (2013.01); *B23K 1/19* (2013.01); *B23K 35/0222* (2013.01); *B23K 35/0233* (2013.01); *B23K 35/304* (2013.01); *B23K 35/3033* (2013.01); *B32B 15/01* (2013.01); *B23K 2201/14* (2013.01); *B23K 2203/05* (2015.10); *Y10T 428/12944* (2015.01)

(58) Field of Classification Search
USPC ........................... 428/678–680; 420/442–454
See application file for complete search history.

(56) References Cited

U.S. PATENT DOCUMENTS

| 4,142,571 A | 3/1979 | Narasimhan |
| 4,316,572 A | 2/1982 | Sexton et al. |

(Continued)

FOREIGN PATENT DOCUMENTS

| EP | 0 051 461 | 5/1982 |
| JP | 57-106495 A | 7/1982 |

(Continued)

OTHER PUBLICATIONS

Korean-language Office Action issued in counterpart Korean Application No. 10-2014-0113155 dated Apr. 25, 2016 with English translation (8 pages).

(Continued)

*Primary Examiner* — Humera N Sheikh
*Assistant Examiner* — Xiaobei Wang
(74) *Attorney, Agent, or Firm* — Crowell & Moring LLP

(57) ABSTRACT

Disclosed is the semi-amorphous, ductile brazing foil with composition consisting essentially of $Ni_{bal}Cr_aB_bP_cSi_d Mo_eFe_f$ with approximately 24 atomic percent≤a≤approximately 31 atomic percent; b≤approximately 3 atomic percent; approximately 9 atomic percent≤c≤approximately 11 atomic percent; approximately 2 atomic percent≤d≤approximately 4 atomic percent; e≤approximately 2 atomic percent; f≤approximately 1 atomic percent; and the balance being Ni and other impurities; where b+c+d<approximately 16 atomic percent.

9 Claims, 5 Drawing Sheets

(56) References Cited

U.S. PATENT DOCUMENTS

| | | | |
|---|---|---|---|
| 5,158,229 | A | 10/1992 | Bose et al. |
| 6,200,690 | B1 * | 3/2001 | Rabinkin ........... B23K 35/0233 |
| | | | 148/403 |
| 6,203,754 | B1 * | 3/2001 | Sugiyama ............ B23K 35/304 |
| | | | 228/262.42 |
| 6,551,421 | B1 | 4/2003 | Rabinkin |
| 7,179,540 | B2 | 2/2007 | Tada |
| 2005/0260437 | A1 | 11/2005 | Kuroki et al. |
| 2009/0110955 | A1 * | 4/2009 | Hartmann et al. ............ 428/684 |
| 2010/0028716 | A1 | 2/2010 | Nuetzel et al. |
| 2011/0226459 | A1 | 9/2011 | Sjodin |

FOREIGN PATENT DOCUMENTS

| | | | |
|---|---|---|---|
| JP | 2011-501700 A | | 1/2011 |
| KR | 10-2010-0050576 | | 5/2010 |
| WO | WO2012/123860 | * | 8/2012 |

OTHER PUBLICATIONS

First Office Action issued in counterpart Japanese Application No. 2014-173387 dated Jan. 5, 2016 with English translation (7pages).

Korean Office Action issued in counterpart Korean Application No. 10-2014-0113155 dated Nov. 1, 2016, with English translation (six (6) pages).

International Search Report (PCT/ISA/210) issued in PCT Application No. PCT/US14/52675 dated Nov. 24, 2015 (2 pages).

International Preliminary Report on Patentability (PCT/IB/338 & PCT/IB/373) issued in PCT Application No. PCT/US2014/52675 dated Jun. 23, 2016, including Written Opinion (PCT/ISA/237), (7 pages).

Korean Office Action issued in counterpart Korean Application No. 10-2014-0113155 dated Jul. 21, 2016, with English translation (five (5) pages).

Rabinkin, "Overview: Brazing With (NiCoCr)—B—Si Amorphous Brazing Filler Metals: Alloys, Processing, Joint Structure, Properties, Applications", Science and Technology of Welding and Joining, Jun. 2004, pp. 1-40.

Theisen et al., "Invited Lecture: Recent Developments in Amorphous Brazing Foil", 2014 International Conference of Brazing, Soldering and Special Joining Technologies, Jun. 9-13, 2014, pp. 120-124.

Kay, "Brazing Furnaces:Vacuum vs. Continuous-Belt", Vac Aero International Inc., Dec. 7, 2015, https://vacaero.com/information-resources/vacuwn-brazing-with-dan-kay/1471-brazing-funaces-vacuum-vs-continuous-belt.html (four (4) pages).

* cited by examiner

NICKEL-CHROMIUM-PHOSPHOROUS BRAZING ALLOYS

BACKGROUND OF THE INVENTION

1. Field of the Invention

The invention relates to brazing filler metals having nickel-chromium-based alloys containing transition metals such as iron and molybdenum and certain metalloids. The alloys include one or more of nickel, chromium, iron, molybdenum, boron, phosphorus, and silicon, and are particularly useful for brazing metals at lower temperatures than prior art while increasing corrosion resistance.

2. Description of the Prior Art

Atomized brazing powders disclosed in the prior art, with high chromium concentration and with phosphorus as the major melting temperature depressant, require a binder to keep the powder in place as practiced conventionally. This binder has to be "burned off" during the brazing cycle, which creates hydrocarbon build-up on the interior of the furnace. This mix of binder and powder typically outgases during the brazing cycle, making it more likely to trap gas pockets in the brazed object.

Prior art chromium-containing brazing foils have high concentrations of metalloids such as boron and phosphorous, which create brittle intermetallics in the brazed joints. These intermetallics are typically chromium borides or other chromium phosphides. Because of the brittleness of the brazed joints, the joints often crack, resulting in disintegration of the brazed products.

Brazing of nickel-chromium based alloys disclosed in the prior art is restricted to a vacuum-type oven because of the high temperatures that are required during the brazing operation, combined with the need for protective atmospheres. The vacuum brazing process is extremely slow and expensive as compared to a belt/continuous furnace. However, the brazing temperatures of powder and other brazing foils are too high for belt ovens, which are typically limited to 1100° C.

SUMMARY OF THE INVENTION

An embodiment of the present invention is directed to a homogeneous, ductile brazing foil. The foil includes Ni, Cr, P, and Si and may also include one or more of B, Mo, and Fe. In a preferred embodiment, the composition of the foil may be expressed as $Ni_{bal}Cr_aB_bP_cSi_dMo_eFe_f$ with approximately 24 atomic percent≤a≤approximately 31 atomic percent; b≤approximately 3 atomic percent; approximately 9 atomic percent≤c≤approximately 11 atomic percent; approximately 2 atomic percent≤d≤approximately 4 atomic percent; e≤approximately 2 atomic percent; f≤approximately 1 atomic percent; and the balance being Ni and other impurities; where b+c+d<approximately 16 atomic percent.

The foil may be placed on the material to be brazed via resistance welding or friction requiring no binder, and the brazing process may be completed without any additional processing.

The content of metalloids B, P, and Si for the invention is preferably optimized to simultaneously (1) depress the melting point, (2) keep the metalloid concentration as low as possible to reduce brittle intermetallics, and (3) maintain a recommended brazing temperature below 1100° C.

The chromium content of the ductile brazing foil may be increased in order to create a ductile Ni—Cr—P matrix in the braze joint after brazing.

The preferred brazing temperature of the foil is below 1100° C. so that processing can be accomplished in a belt/continuous furnace; however, any suitable brazing temperature may be used. Brazing in such a furnace may help reduce processing costs as well as prevent excessive thermal stresses in the brazed product.

BRIEF DESCRIPTION OF THE DRAWINGS

The invention will be more fully understood and further advantages will become apparent when reference is made to the following detailed description of the embodiments and the accompanying drawing in which.

DETAILED DESCRIPTION OF THE EMBODIMENTS

Figure 1:
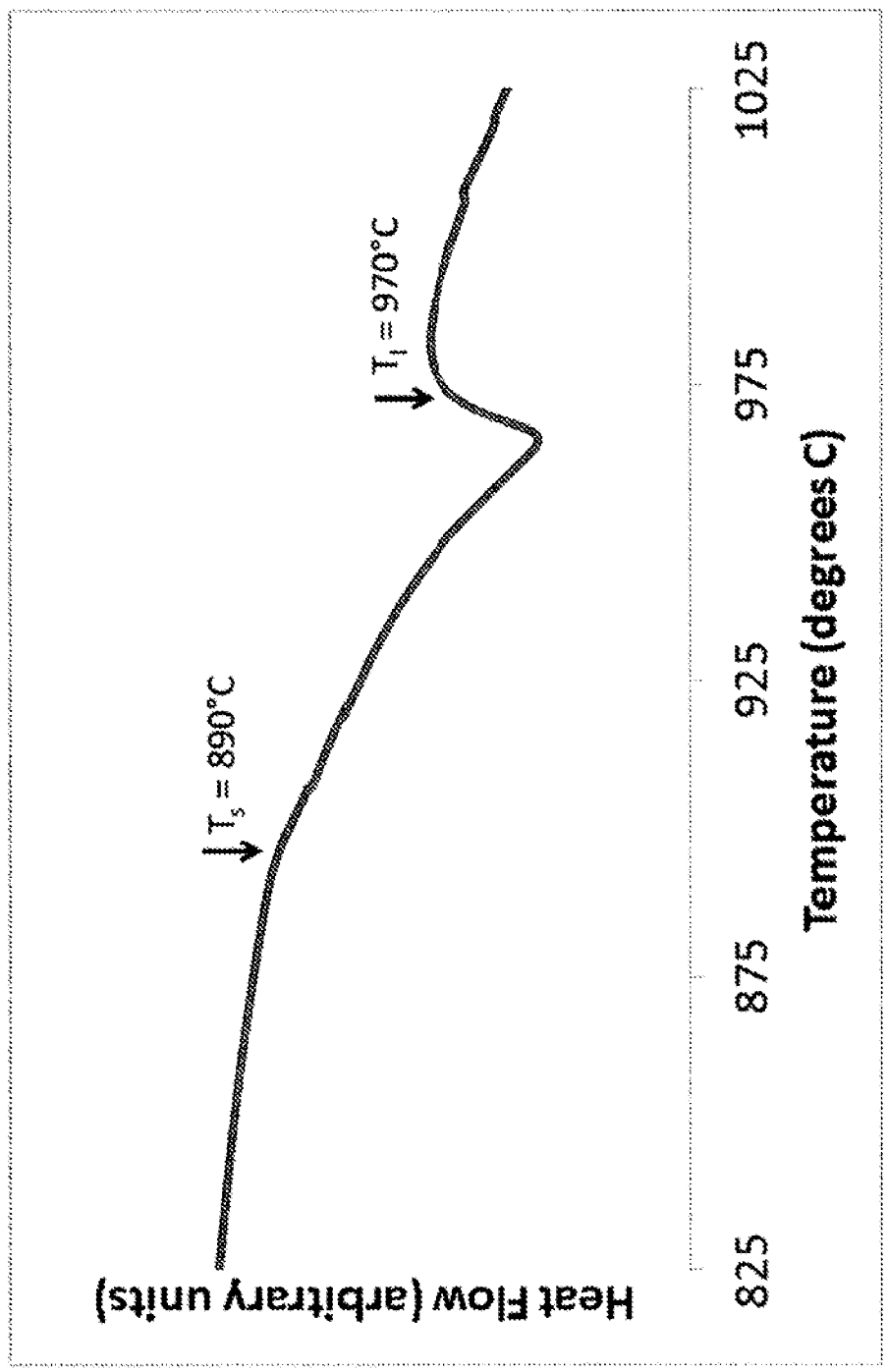
FIG. 1 illustrates a differential thermal analysis (DTA) scan of sample Alloy 2 in Table I, with temperature on the horizontal axis and heat in arbitrary units on the vertical axis. $T_s$ and $T_l$ represent the solidus and liquidus temperature, respectively.

The invention consists of a ductile brazing foil that is produced via melt spinning according to the method described in U.S. Pat. No. 4,142,571, the contents of which are incorporated by reference herein in their entirety. Melt spinning consists of a mass of molten metal being quenched onto a spinning wheel at a preferred rate of $10^{6°}$ C. per second in order to form a metastable glassy structure; any other suitable spinning rate may be used. This results in the invention having an amorphous or semi-amorphous structure allowing the foil the ability to be cast very thin (in a preferred range of approximately 25-51 μm thick) and in a continuous, fully homogenized ribbon form.

The ability of the foil to be cast in very thin, continuous ribbon form allows production of heat exchangers and other plate-fin type applications to join thin stainless steel sheets together. The benefit of utilizing thin stainless steel sheets in heat-exchanger applications is that, for the end user, more media are separated, increasing the exposed surface area, by a larger concentration of channels. This increases the total thermal efficiency of the heat exchanger. However, care must be taken when brazing thin stainless steel sheets due to possible erosion that could occur during brazing, reducing the total thickness of the stainless steel sheets. An advantage of a preferred embodiment is to cast to small thicknesses to reduce the prevalence of erosion during brazing. The thinner sheet also allows the application to reduce weight, which saves cost and increases full economy, if used, e.g., in an automotive-type heat exchanger.

The invention is amorphous or semi-amorphous, ductile brazing foil made from Ni, Cr, P, and Si and may also include one or more of B, Mo, and Fe. In a preferred embodiment, the composition of the foil may be expressed as $Ni_{bal}Cr_aB_bP_cSi_dMo_eFe_f$ with approximately 24 atomic percent≤a≤approximately 31 atomic percent; b≤approximately 3 atomic percent; approximately 9 atomic percent≤c≤approximately 11 atomic percent; approximately 2 atomic percent≤d≤approximately 4 atomic percent; e≤approximately 2 atomic percent; f≤approximately 1 atomic percent; and the balance being Ni and other impurities; where b+c+d<approximately 16 atomic percent.

In a preferred embodiment, the concentration of chromium is from about 24 atomic percent to about 31 atomic percent. A concentration in this range provides increased corrosion resistance as compared to Ni—Cr—B—P—Si brazing alloys with chromium concentrations below about 24 atomic percent.

The concentration of metalloids is preferably optimized to be able to produce an amorphous or semi-amorphous foil and allow processing on a belt/continuous furnace. Two examples of this preferred embodiment have the chemical compositions given in Table I below. In Alloy 1, the boron content is zero; such an allow may be used in applications requiring no boron in their material.

In Alloy 2, the concentration of boron is 2 atomic percent. Alloys of this preferred embodiment having boron may be processed on the same manufacturing lines of Ni—Cr—B—Si alloys. Other suitable concentrations of boron outside those selected for Alloy 1 and Alloy 2 can, of course, be used.

In this preferred embodiment, phosphorus, which is the major melting temperature depressant, has an concentration between about 9 atomic percent and about 11 atomic percent. This drops the melting temperature of the alloy by 31° C. per atomic percent of the phosphorus.

In this preferred embodiment, the silicon atomic concentration range is between about 2 atomic percent and about 4 atomic percent, which increases ease of material's fabrication into amorphous states during foil production and also acts as a melting temperature depressant.

In this preferred embodiment, total metalloid content (boron plus phosphorus plus silicon) is less than about 16 atomic percent. This percent is less than the total found in the prior art and acts to minimize the potential for brittle intermallics to be formed during the brazing process.

As a practical matter, minimal amounts of iron will be found in most foils manufactured by the process described in this preferred embodiment due to its presence in raw materials.

In this preferred embodiment, molybdenum is in the range from 0 to about 1 percent. In Alloy 1, there is no added molybdenum. In Alloy 2, 1 atomic weight percent is added to help increase corrosion resistance and solubility with 316 stainless steel alloys. Other suitable concentrations of molybdenum can, of course, be used.

TABLE I

Chemical composition examples of the disclosed brazing foil. The solidus and liquidus temperatures determined by DTA of Example 1 are given for each composition.

| Alloy | Ni Atomic Percent) | Cr Atomic Percent) | B Atomic Percent) | P Atomic Percent) | Si (Atomic Percent) | Other (Atomic Percent) | Solidus (° C.) | Liquidus (° C.) |
|---|---|---|---|---|---|---|---|---|
| 1 | balance | 30 | 0 | 10 | 3 | <1Fe | 980 | 1050 |
| 2 | balance | 25 | 2 | 10 | 3 | <1Fe/1Mo | 890 | 970 |

Figure 4:
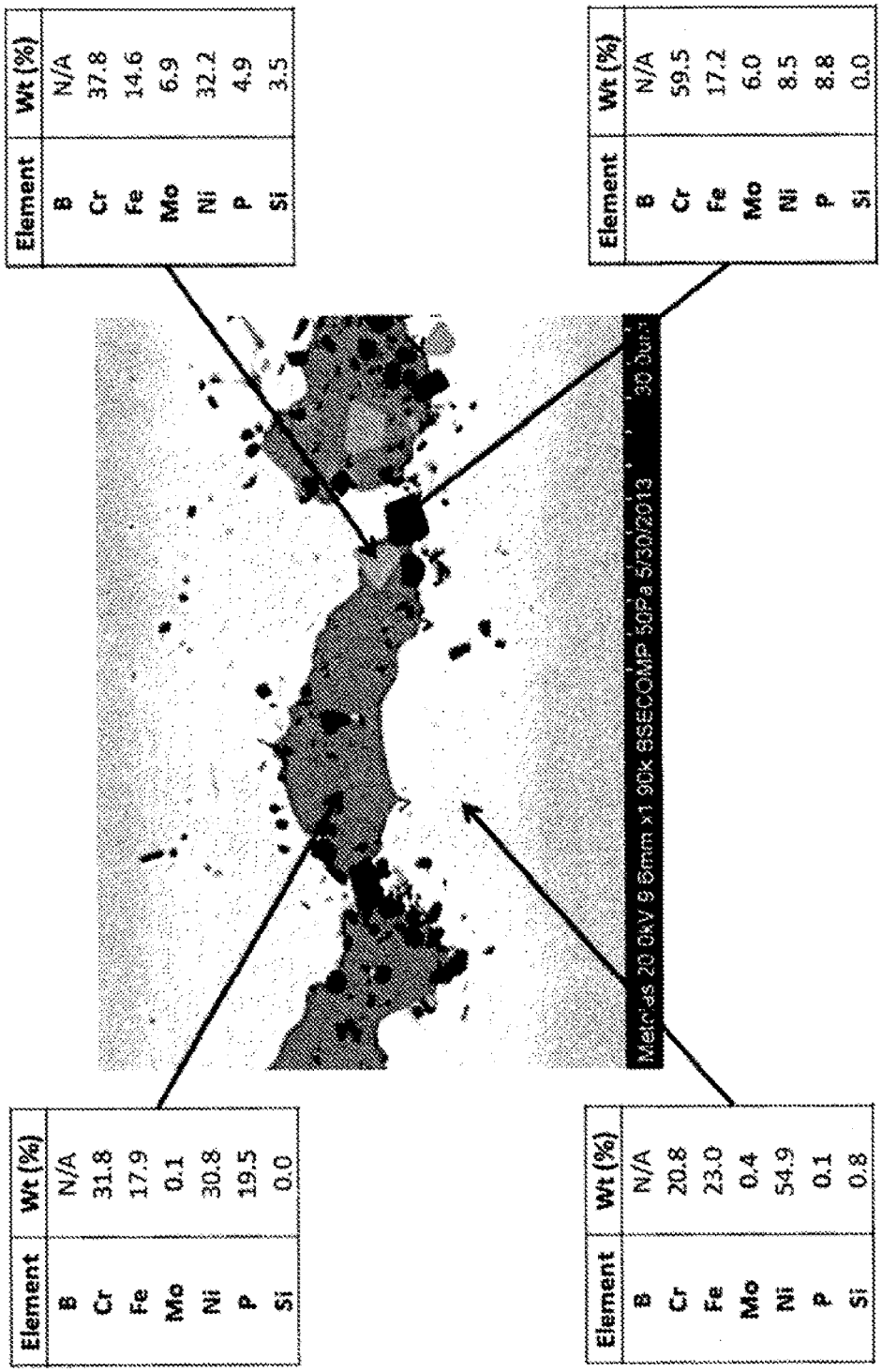
FIG. 4 illustrates an optical microscope image of the local structure in the brazed section between the stainless steel sheets of FIG. 3. The chemical compositions in the representative sections are given in the boxes shown.

Alloys of this preferred embodiment and having the chemical compositions given in the above paragraphs [0013]-[0021] were cast according to the teachings of U.S. Pat. No. 4,142,571 and were utilized as brazing foils as described in Example 1. The brazed section between two stainless steel sheets had metallurgical phases shown in FIG. 4, showing chromium-borides accumulated in the phosphorous-rich phase.

Figure 5:
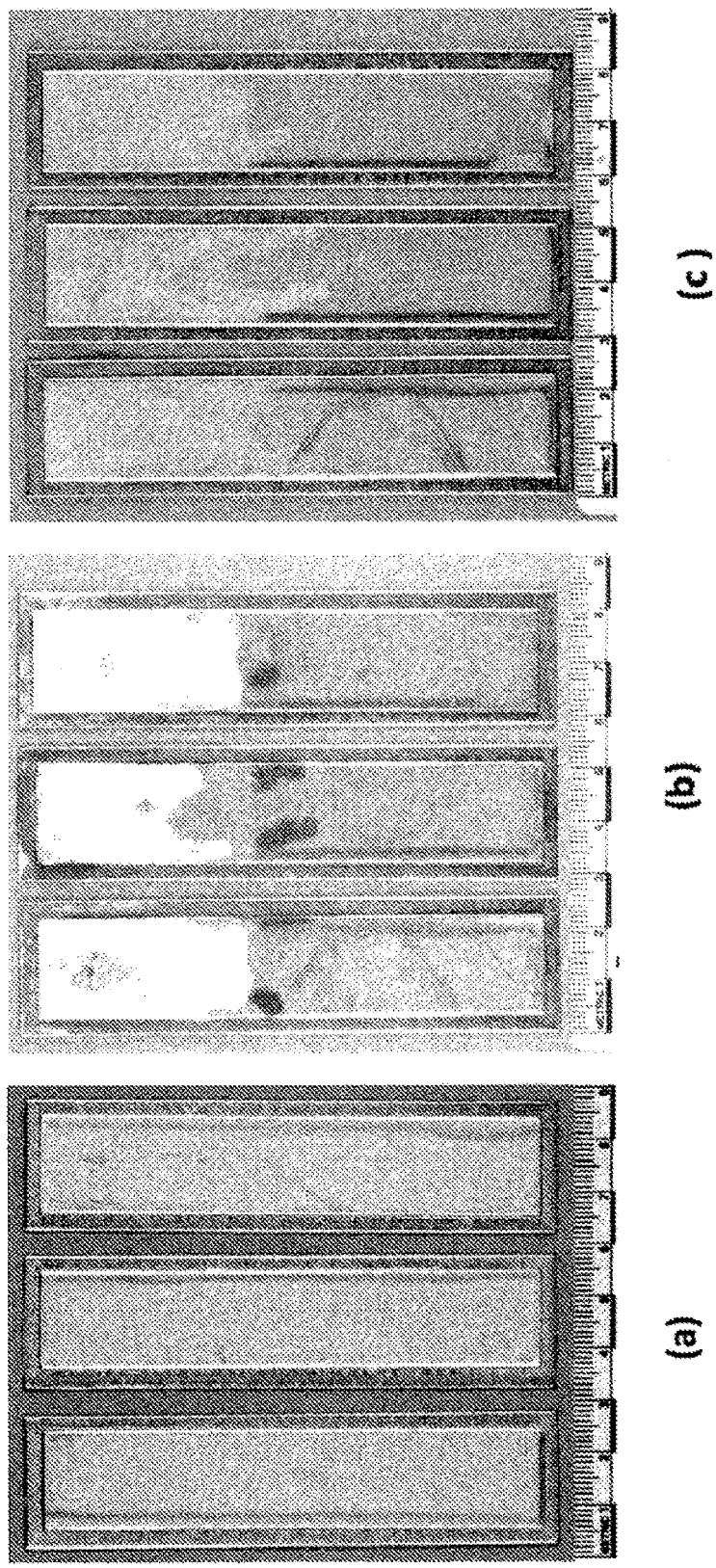
FIGS. 5a, 5b, and 5c illustrate optical microscope images of the surfaces of (a) as-prepared specimens, (b) specimens after a corrosion test and (c) specimens cleaned after the corrosion test.

Corrosion testing of the brazed section of Example I was conducted as described in Example II. The results are illustrated in FIG. 5, indicating the tests passed the criteria set forth in the industrial standards adopted in the automotive industry.

Example I

Figure 2:
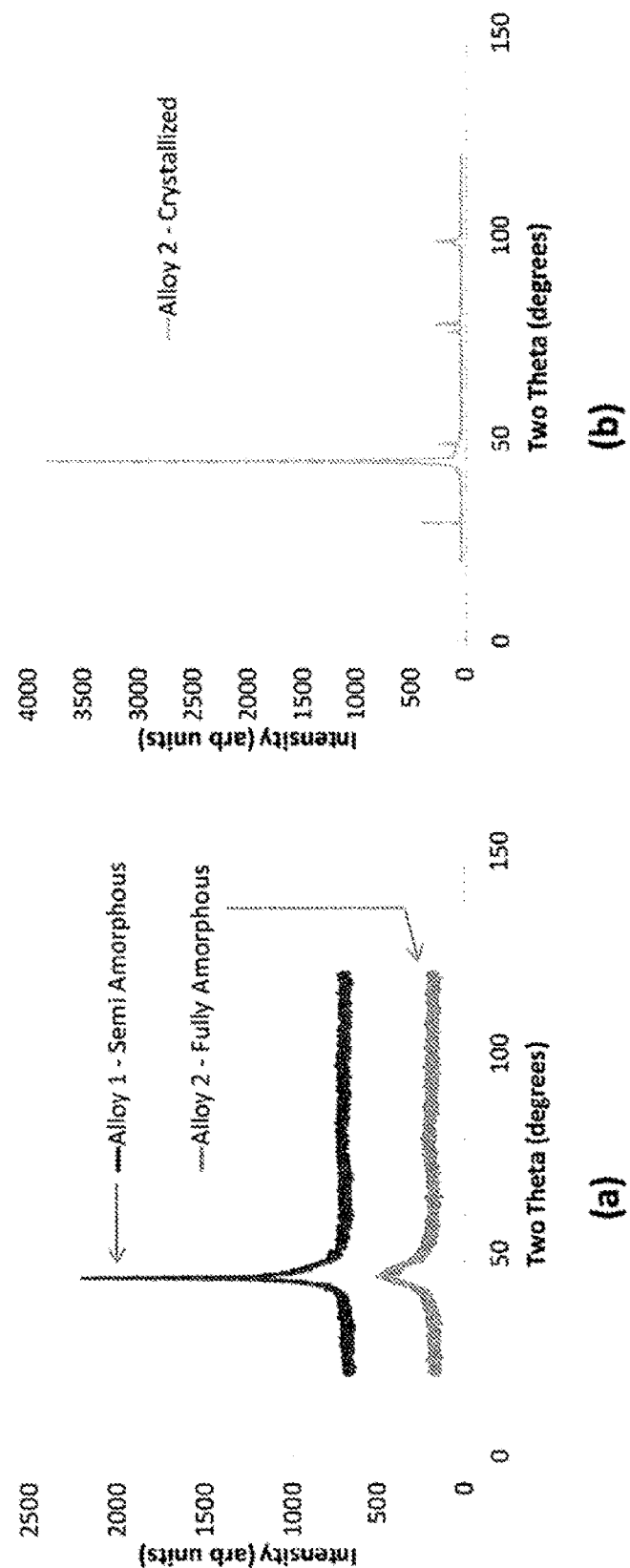
FIGS. 2a and 2b illustrate X-ray diffraction (XRD) scans, with X-ray angle on the horizontal axis and X-ray intensity on the vertical axis. Alloy 1 is seen to be semi-amorphous (i.e., substantially amorphous and containing less than about 10% crystalline phase) and Alloy 2 is shown to be fully amorphous.

A differential thermal analysis (DTA) on an amorphous alloy ribbon having a composition of $Ni_{60}Cr_{25}B_2P_{10}Si_3$ (numbers in atomic percent) was made by a conventional Differential Thermal Analyzer to determine the alloy's solidus ($T_s$) and liquidus ($T_l$) temperatures. They were found to be $T_s$=890° C. and $T_l$=970° C., and were used to determine the optimal brazing temperature. A DTA scan for Alloy 2 is shown in FIG. 1. An X-ray diffraction (XRD) scan reveals that the ribbon is fully amorphous (Alloy 2 in FIG. 2a) or semi-amorphous (Alloy 1 in FIG. 2a) in the as-cast state. For comparison, Alloy 2 was heat treated above the crystallization temperature and the XRD scan is included in FIG. 2b.

Figure 3:
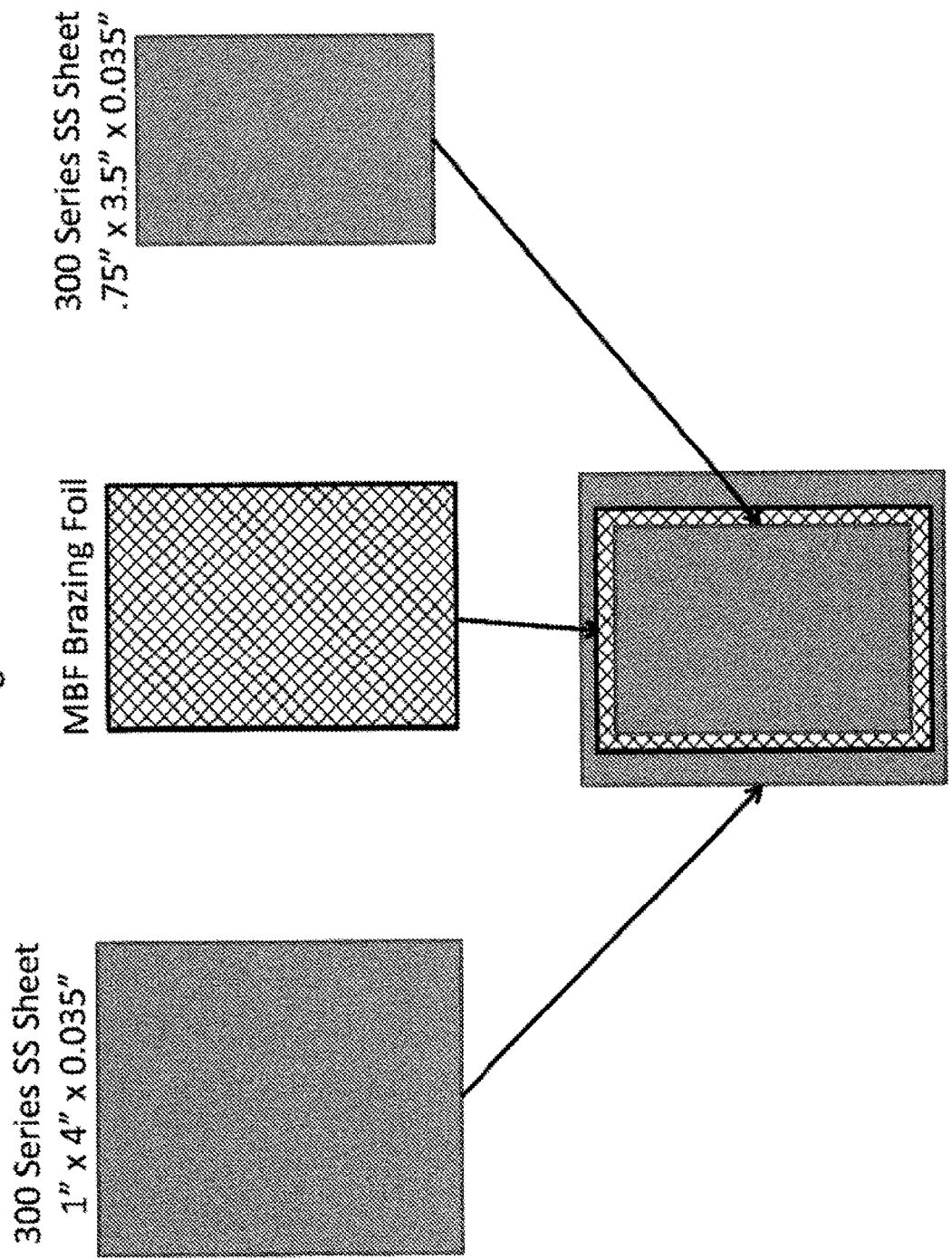
FIG. 3 illustrates a brazing foil of an embodiment of the invention sandwiched between two stainless steel sheets.

A brazing foil having the composition of $Ni_{60}Cr_{25}B_2P_{10}Si_3$ was placed between two 300 series stainless steel sheets with dimensions of 2.5 cm×10.0 cm×0.09 cm and 1.9 cm×8.9 cm×0.09 cm as shown in FIG. 3 and was brazed at a brazing temperature of 1000° C. with a holding time of 15-20 minutes after being heated to a first dwell temperatures of 260° C. with a holding time of 20-45 minutes and a second dwell temperature 900° C. with a holding time of 20-45 minutes. Conventional metallography was used to identify the metallurgical phases appearing in the brazed section between the two stainless steel sheets and an example is shown in FIG. 4, indicating that chromium-borides accumulated in the phosphorous-rich phase.

Example 2

The brazements of Example 1 were cleared with soap and water and solvent degreased with a final rinse in acetone. These cleaned brazements were weighed on an analytical balance to the nearest 0.0001 g, and overall measurements of length, width, and thickness of each brazement were made using a caliper with resolution of 0.01 mm. The reagent for corrosion testing was prepared based on the concentration in Table II.

TABLE II

| Test solution reagent and concentration | | |
| --- | --- | --- |
| Test Solution | Concentration (ppm) | Solution pH |
| $Cl^-$ | 100 | 8.0 ± 0.2 |
| $NO_3^-$ | 20 | |
| $SO_3^{2-}$ | 600 | |
| $SO_4^{2-}$ | 600 | |
| $CH_3COO^1$ | 800 | |

Three brazements of Example 1 were corrosion tested following Method B of JASO (Japan Automotive Standards Organization) M611-92E Standard for internal corrosion test method for automotive muffler, and three brazements were left unexposed as control specimens. Method B is a cyclic test and one cycle consists of 5 and 24 hour immersions in an oven at 80° C., followed by a cool down to room temperature and reagent change. After these five immersions, a sixth immersion was completed in an oven at 250° C. for 24 hours. Four total cycles were completed, which equates to exposure at 80° C. for 480 hours and 250° C. for 96 hours. Once the required cycles were completed, the brazements were removed and photographed. Loose deposits were removed according to the JASO M611, Section 7.2.2, using a solution of 60% nitric acid at 80° C. for 2 hours, rinsed with dionized water, and dried. The samples then were weighed on the same analytical balance and overall measurements of length, width, and thickness were repeated. The results were recorded from the JASO M611-92E requirements, and each one of each specimens was cross-sectioned, polished, and viewed under an optical microscope at both 75× and 150× magnifications. Some of the results are shown in FIGS. 5a, 5b, and 5c, where FIG. 5a illustrates the front face of a brazed specimen, FIG. 5b illustrates the specimen surface after exposure to solution reagent, and FIG. 5c illustrates the specimen surface after surface being cleaned.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brazing foil of an amorphous or semi-amorphous alloy consisting of $Ni_{bal}Cr_aP_cSi_dMo_eFe_f$ with 24 atomic percent≤a≤31 atomic percent; 9 atomic percent≤c≤11 atomic percent; 2 atomic percent≤d≤4 atomic percent; e≤2 atomic percent; f≤1 atomic percent; and the balance being Ni, and impurities, where c+d<16 atomic percent, and wherein the alloy has a liquidus temperature from 970 to 1050° C.

2. The foil of claim 1, wherein e≤1 atomic percent.

3. A brazed metal device, comprising:
a first metal component;
a brazing foil; and
a second metal component;
wherein the brazing foil consists of $Ni_{bal}Cr_aP_cSi_dMo_eFe_f$ with 24 atomic percent≤a≤31 atomic percent; 9 atomic percent≤c≤11 atomic percent; 2 atomic percent≤d≤4 atomic percent; e≤2 atomic percent; f≤1 atomic percent; and the balance being Ni, and impurities, where c+d<16 atomic percent, and the brazing foil is an amorphous or semi-amorphous alloy.

4. A method of manufacturing a brazed metal device, comprising:
placing a brazing foil between first and second metal components; and
heating the brazing foil and first and second metal components in a belt furnace;
wherein the brazing foil consists of $Ni_{bal}Cr_aP_cSi_dMo_eFe_f$ with 24 atomic percent≤a≤31 atomic percent; 9 atomic percent≤c≤11 atomic percent; 2 atomic percent≤d≤4 atomic percent; e≤2 atomic percent; f≤1 atomic percent; and the balance being Ni, and impurities, where c+d<16 atomic percent, and the brazing foil is an amorphous or semi-amorphous alloy.

5. The method of claim 4, wherein the furnace temperature is below approximately 1100° C.

6. The method of claim 4, wherein the furnace temperature is below approximately 1000° C.

7. A brazed metallic component, comprising:
a first sheet of metal;
a ductile brazing foil; and
a second sheet of metal,
wherein the ductile brazing foil has a chemical composition consisting of $Ni_{bal}Cr_aP_cSi_dMo_eFe_f$ with 24 atomic percent≤a≤31 atomic percent; 9 atomic percent≤c≤11 atomic percent; 2 atomic percent≤d≤4 atomic percent; e≤2 atomic percent; f≤1 atomic percent; and the balance being Ni, and impurities, where c+d<16 atomic percent, and the brazing foil is an amorphous or semi-amorphous alloy.

8. A heat exchanger comprising:
a first sheet of metal;
a ductile brazing foil; and
a second sheet of metal,
wherein the ductile brazing foil has a chemical composition consisting of $Ni_{bal}Cr_aP_cSi_dMo_eFe_f$ with 24 atomic percent≤a≤31 atomic percent; 9 atomic percent≤c≤11 atomic percent; 2 atomic percent≤d≤4 atomic percent; e≤2 atomic percent; f≤1 atomic percent; and the balance being Ni, and ether impurities, where c+d<16 atomic percent, and the brazing foil is an amorphous or semi-amorphous alloy.

9. An automobile comprising the heat exchanger of claim 8.

* * * * *